(12) United States Patent
Hubner et al.

(10) Patent No.: US 8,886,128 B2
(45) Date of Patent: Nov. 11, 2014

(54) METHOD AND SYSTEM FOR PROVIDING PROXIMITY-RELATIONSHIP GROUP CREATION

(75) Inventors: Paul Hubner, McKinney, TX (US); Robert A. Clavenna, Lucas, TX (US); Kristopher Pate, Flower Mound, TX (US); Steven T. Archer, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 12/964,772

(22) Filed: Dec. 10, 2010

(65) Prior Publication Data

US 2012/0149309 A1 Jun. 14, 2012

(51) Int. Cl.
| | |
|---|---|
| *H04B 17/00* | (2006.01) |
| *H04W 4/08* | (2009.01) |
| *H04W 4/02* | (2009.01) |
| *H04W 24/00* | (2009.01) |
| *H04W 88/02* | (2009.01) |
| *H04W 8/18* | (2009.01) |

(52) U.S. Cl.
CPC .............. *H04W 4/08* (2013.01); *H04W 4/025* (2013.01); *H04W 24/00* (2013.01); *H04W 88/02* (2013.01); *H04W 8/186* (2013.01); *H04W 4/023* (2013.01)
USPC .................. 455/67.11; 455/403; 455/407

(58) Field of Classification Search
USPC ............... 455/67.11, 403, 407, 408, 414.1
See application file for complete search history.

(56) References Cited

U.S. PATENT DOCUMENTS

| | | | | |
|---|---|---|---|---|
| 6,766,171 | B2 * | 7/2004 | Pan et al. | 455/439 |
| 8,068,925 | B2 * | 11/2011 | McKillop et al. | 700/94 |
| 2004/0039624 | A1 * | 2/2004 | Ikezawa et al. | 705/8 |
| 2007/0206741 | A1 * | 9/2007 | Tiliks et al. | 379/106.02 |

\* cited by examiner

*Primary Examiner* — Tuan H Nguyen (57) ABSTRACT

An approach for enabling computing devices to establish and recognize a relationship group based on physical proximity is described. A proximity management platform monitors a plurality of activities of a mobile device. The monitored activities include communications with one or more devices within a predetermined proximity of the mobile device. The proximity management platform stores the monitored activities and associated timing information.

20 Claims, 8 Drawing Sheets

METHOD AND SYSTEM FOR PROVIDING PROXIMITY-RELATIONSHIP GROUP CREATION

BACKGROUND INFORMATION

Manufacturers of devices such as mobile phones, smartphones and the like are continually challenged to deliver value and convenience to consumers by, for example, providing compelling network services and advancing the underlying technologies. One area of interest has been the development of services and technologies for enabling shared or group based interaction among devices for use within a business environment, home or other organization. Traditionally, the establishment of relationships among devices within for example a local area network (LAN) require extensive manual configuration by the user or administrator of the LAN. Given the ubiquity of wireless networking, this configuration effort becomes even more extensive, as devices can continually come into and leave the wireless network coverage area. A further challenge is the fact that mobile devices can engage in establishment of adhoc wireless networks at a peer-to-peer level without any centralized control of the relationships of the devices.

Based on the foregoing, there is a need for enabling computing devices to establish and recognize a relationship group in using more efficient and convenient approaches.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for enabling computing devices to establish and recognize a relationship group based on physical proximity is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1A:
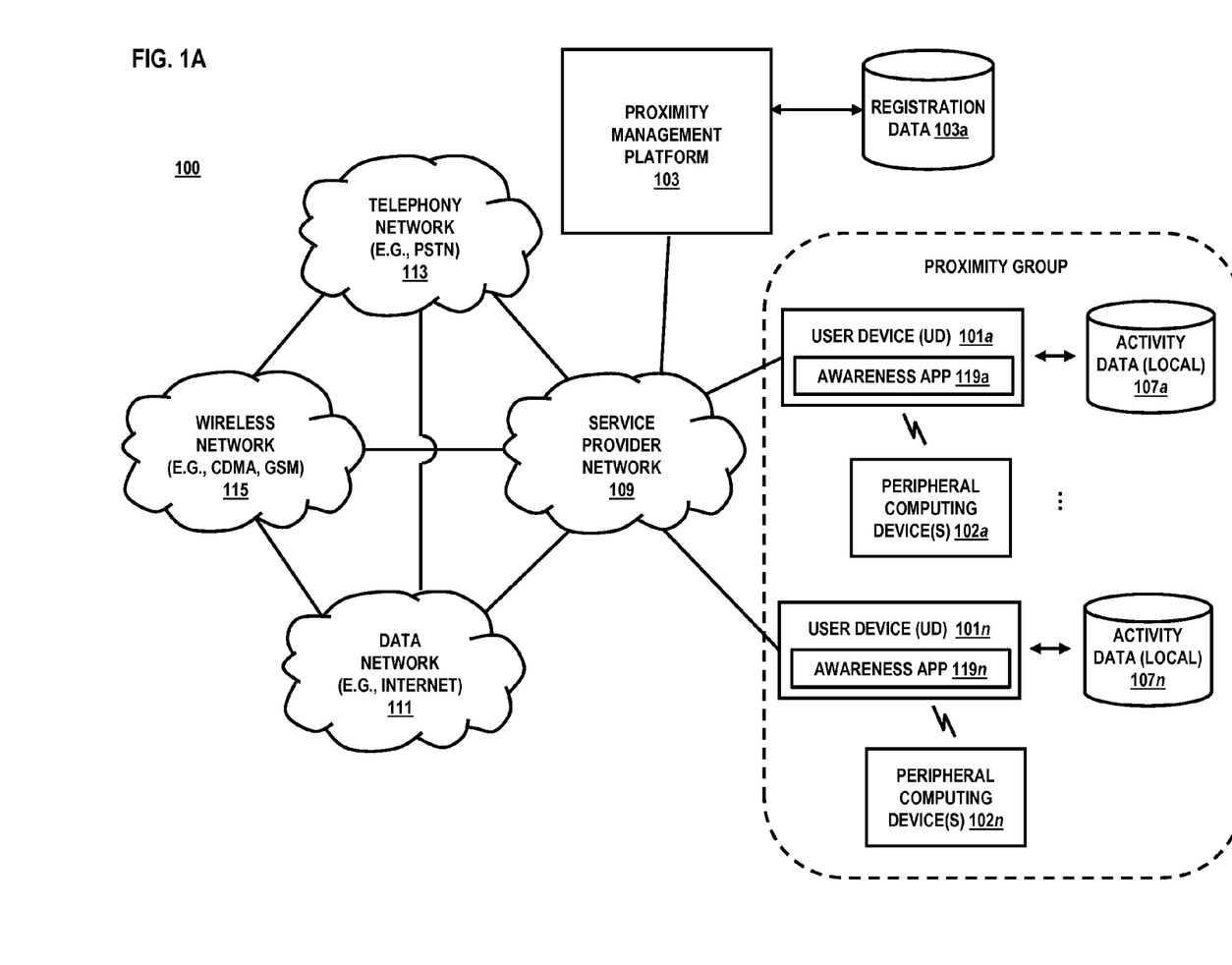
FIGS. 1A and 1B, are, respectively, a diagram of a system and a flowchart of an associated process for enabling computing devices to establish and recognize a relationship group based on physical proximity, according to various embodiments.

FIG. 1A is a diagram of a system for enabling computing devices to establish and recognize a shared relationship group based on physical proximity, according to one embodiment. For the purposes of explanation, system 100 is shown to include a proximity management platform 103 configured to enable one or more user devices 101a-101n (e.g., mobile device, smartphone, etc.) to formulate, and subsequently, regulate their interaction with one another on the basis of their physical proximity. It is noted, therefore, that platform 103 provides for the engagement of the groups of user devices 101a-101n as premised or based upon characteristics, patterns, criteria or conditions relating to recognized proximity patterns. According to certain embodiments, the proximity management platform 103 is maintained by a service provider as part of a managed service to provide autonomous proximity relationship group creation.

Typical approaches for establishing relationship groups require a user to define or name the relationship group as well as indicate which other devices are within the group. For example, a device user may add another device, such as a printer or copier, as a member of a "Shared Devices Group" that includes their laptop or mobile phone. Unfortunately, there is no convenient means of enabling a user device to identify relationship groups of which it is associated based on the regular occurrence of the device's physical proximity to other devices within the group. Moreover, as a result, computing devices cannot readily enable data sharing and other activities to be performed on the basis of recognized patterns of device proximity.

In certain embodiments, a "proximity pattern" pertains to any set of data for characterizing a commonly observed mode of activity among one or more user devices 101a-101n when in the presence of each other, other devices, or a combination thereof. By way of example, when the user device 101a is a mobile device, it may engage in communication activities with one or more peripheral devices 102a-102n (e.g., printer, server, etc.), such as another mobile device user device 101n, a server configured to a communication network within range of or accessible to the mobile device 101a, a printer 102a configured to a communication network within range of or accessible to the mobile device 101a, etc. In this example, the peripheral devices 102a-102n (e.g., server and printer) may communicate with the mobile device 101a by way of a detectable signaling protocol, such as Bluetooth, Wi-Fi, or the like. As another example, the user device 101a such as a mobile device may perform data sharing or application sharing activities with other mobile devices or dedicated (e.g., stationary) computing devices as they are within proximity of each other.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment or exchanging of data. In addition, user devices 101a-101n may facilitate various input means for receiving and generating information, including touch screen capability, keyboard and keypad data entry, voice-based input mechanisms and the like. Any known and future implementations of user devices 101 are applicable.

The capability to group devices intelligently is utilized in a variety of applications. For instance, social networking applications, shared communication interfaces, cloud computing technologies, various web services and hosted solutions and the like allow a defined group of user devices to interact with one another by way of a communication network. Typically, the group of participating users and/or user devices that formulate the group, or have the ability to gain access to the relationship group, is based on mere affiliation. For example, in social networking applications, at least one user must expressly indicate that another user is a "friend" and therefore suitable for interaction with the group. As another example, a "Company X Workgroup" may be defined as part of a cloud computing application for expressly indicating a group of user devices that may share data and resources within the organization (e.g., Company X). In both of these examples, it is noted that group relationship initiation and establishment, as well as group classification (e.g., the name assigned to the relationship group for characterizing it) are performed by the user.

Unfortunately, traditionally there is no convenient means of enabling the identification or establishment of relationship groups based on the regular occurrence of device proximity; such that direct user intervention or action is not required in the formation of the group, in the adding of others to the group, or in the recognition of the relationship group as the devices are moved about. Furthermore, there is no means for enabling automated engagement of activities by user devices on the basis of recognized proximity patterns To address this issue, the system 100 of FIG. 1A enables computing devices, both mobile and stationary, to formulate relationship groups on the basis of identified proximity patterns related to said devices. In addition, the system 100 enables the devices to engage in predetermined activities on the basis of a recognized proximity based relationship group. It is noted that the proximity management platform 103 may be provided by a service provider, to respective users of user devices 101a-101n for enabling the above described capabilities. By way of example, the proximity management platform 103 may maintain registration data 103a regarding the various registered users and user devices 101a-101n. The registration data 103a may include various information for associating the user and user devices with the service offerings afforded by the platform 103, including a registration identifier, user name and identifier, device name and type, device identifier, data sharing preferences, service level preferences, etc. The profile data may also indicate various permission settings of the registered device user, such as permission to enable the proximity management platform 103 to suggest a name or classification for a newly defined proximity pattern. Additionally or alternatively, the functions of the proximity management platform 103 can be executed by one or more of the individual user devices 101a-101n.

Figure 1B:
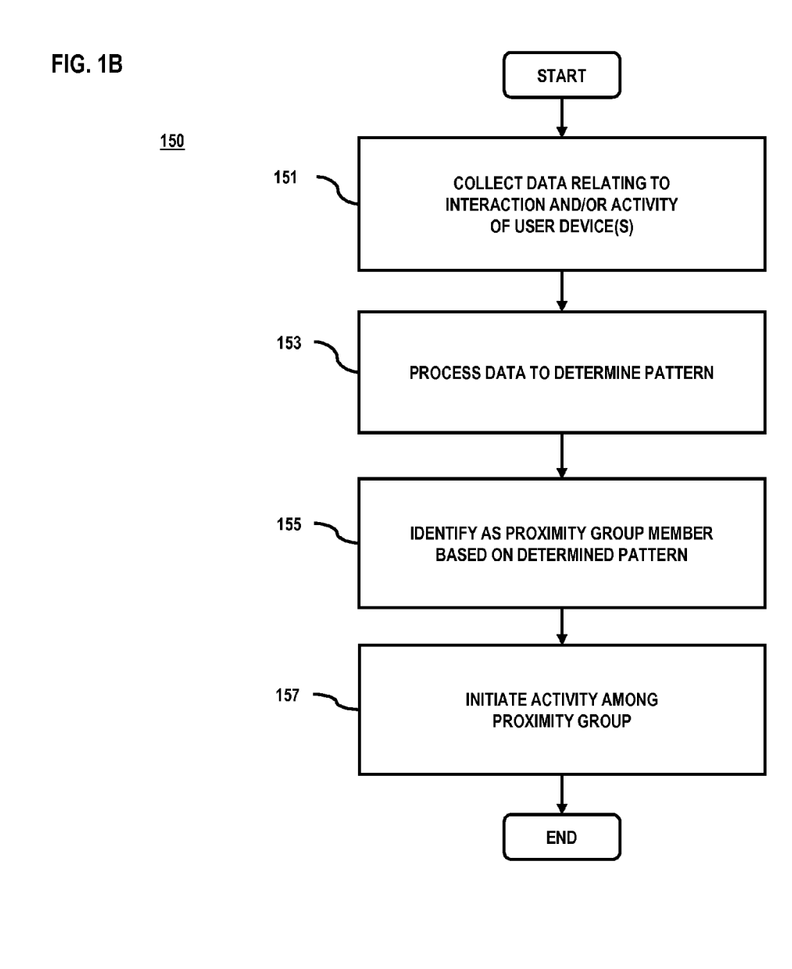

As seen in process 150 of FIG. 1B, a user device 101a, in step 151, collects a set of data associated with the interactions and/or activities of the user device 101a with other user devices 101n and/or peripheral computing devices 102a-102 (e.g., printer, server, router, hub, access point, etc.) within a predetermined proximity of the coverage area of the wireless communications of the subject user device and/or wireless local area network (WLAN). Alternatively or additionally, the platform 103 can request the data from the user devices 101a-101n, and to aggregate the data for storage and subsequent analysis. For purposes of illustration, the activity data is obtained by the proximity management platform 103 from the one or more user devices 101a-101n directly, which store the data in local storage 107a-107n accessible to each respective device. As mentioned before, "activity data" may pertain to any information pertaining to the communication, data sharing or application sharing actions of devices within proximity of each other. In certain embodiments, the user devices 101a-101n may gather activity data by way of an awareness application 119a-119n, which may run in connection with the operating system of respective devices 101a-101n. The awareness application 119 has visibility to the various signals detected by various integrated sensory systems of the user devices 101a-101n, including Bluetooth signals, Wi-Fi broadcast signals, audio signals, the internet protocol (IP) stack (e.g., transmitted data packets/messages), and any other signals or metrics produced as a result of range based communication protocols. By way of example, the awareness application 119 monitors the activities of a respective user device 101 for detecting the following exemplary types of inputs of Table 1:

TABLE 1

A clock for indicating timing information related to an activity;
Bluetooth cluster exchanges;
Wi-Fi broadcast data, such as a Service Set Identifier (SSID), which identifies the public name of the broadcasting wireless network;
Relative signal power levels associated with the SSID;
IP addresses associated with individual networking interfaces;
Ambient light data and visual data;
Sound data;
Acceleration data, such as for detecting device orientation or handset motion; and
Touch data, such as for enabling device usage via a touch screen.

As mentioned, once collected, these inputs are stored to local data stores 107a-107n, but periodically or enabled for real-time aggregation by the proximity management platform 103 into its own database. Hence, by replicating the data of the various user devices 101a-101n via the platform 103, the data may be mined for enabling the detecting of proximity pattern data. More regarding this functionality will be described with respect to FIG. 2.

In step 153, the collected data is processed by one of the user devices 101a-101n and/or platform 103 to determine the proximity pattern. Accordingly, the proximity group member is identified using the determined pattern, per step 155. Thereafter, the process 150 can initiate an activity or process among the proximity group, as in step 157; by way of example, such activity can be the distribution of data (as in the example described with respect to FIG. 4) among the group members. In one embodiment, the one or more proximity patterns are used to set a profile of the user device.

It is noted, though not shown in the figure, that in certain embodiments user devices 101a-101n may be configured to establish connectivity with one another via a local area network (LAN) for providing one or more wireless connections. By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

In certain embodiments, user devices 101a-101n, the proximity management platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

The above arrangement of system 100, in certain embodiments, advantageously permits identification of group relationships among user devices to automatically determine contextual information about the group members; such information can then be used to adapt the devices to the communication environment and/or initiate processes and activities intelligently.

Figure 2:
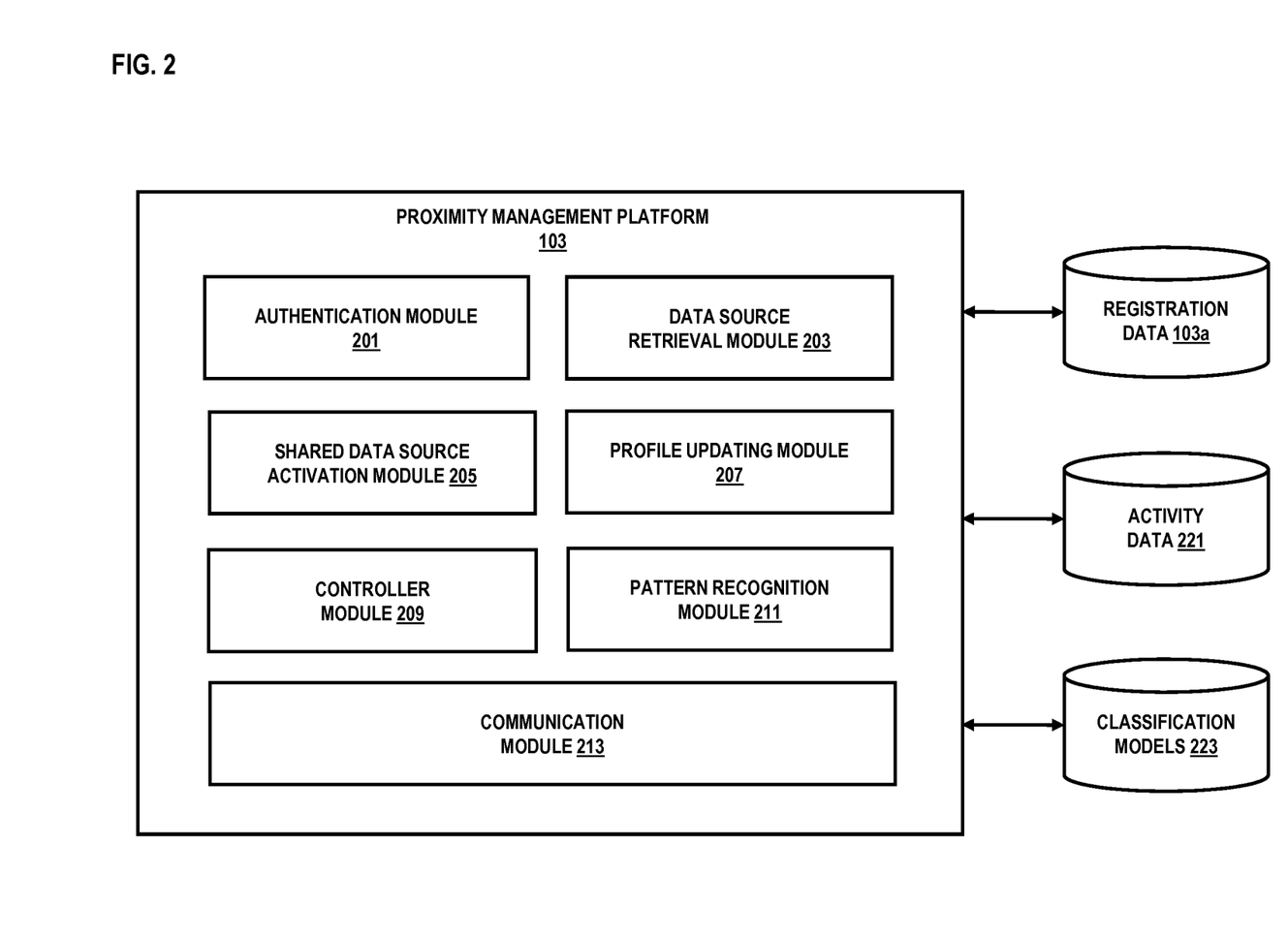
FIG. 2 is a diagram of a proximity management platform for enabling computing devices to establish and recognize a relationship group based on physical proximity, according to one embodiment.

FIG. 2 is a diagram of a proximity management platform for enabling computing devices to establish and recognize a relationship group based on physical proximity, according to one embodiment. The platform 103 includes various executable modules for performing one or more computing, data processing and network based instructions that in combination provide a means of enabling the provisioning of resources of a packetized voice communication solution provider. Such modules can be implemented in hardware, firmware, software, or a combination thereof. In one embodiment, as part of a managed service, the platform 103 can be considered part of service provider network 109. By way of example, the proximity management platform 103 may include an authentication module 201, data source retrieval module 203, shared data source activation module 205, profile updating module 207, controller module 209, pattern recognition module 211, and communication module 213. In addition, the proximity management platform 103 also accesses registration data from a registration database 103a, activity data from activity database 221 and classification models from a classification model database 223.

In one embodiment, an authentication module 201 authenticates users and user devices 101a-101n for interaction with the proximity management platform 103. By way of example, the authentication module 201 receives a request to subscribe to a proximity management service for enabling seamless detection of relationship groups based on proximity information. Authentication may include receiving and validating a login name and/or user identification value as provided or established for a particular user during a subscription or registration process with the service provider. The login name and/or user identification value may be received as input provided by the user by way of the user device 101 or other device via a graphical user interface to the platform 103 presented to a user (e.g., as enabled by a user interface module (not shown)).

In one embodiment, a data source retrieval module retrieves activity data and associated timing information as maintained by the various user devices. The data source retrieval module may be configured to perform on demand retrieval of the data or alternatively, periodic data exchange with the user devices 101. Data retrieval may be triggered by the awareness application 119, such as in response to the detection of input generated by one or more of the sensors of the user device 101—i.e., microphone, camera, antennas, touch screen, etc. As data is collected from multiple different devices 101, the data is associated with a specific user or user device as indicated with respect to the registration data 103a. Once associated, the data is further aggregated as activity data 221 where it may be mined by a pattern recognition module 211 for determining larger proximity-relationship suggestions. It is noted that the timing information associated with a given set of activity data 221 is useful for establishing a relative event occurrence or context relative to proximity based interaction among devices.

In one embodiment, a pattern recognition module 211 analyzes the activity data and timing information in order to classify the activity as one or more proximity patterns. The pattern recognition module 211 processes the activity data and timing information by way of one or more known pattern recognition techniques. Recognition techniques may include the assignment of output values (labels or tags) to a given input value as included as part of the activity data set 221, i.e., according to a fuzzy logic processing algorithm. Another approach may include classification processing, wherein the pattern recognition module 211 assigns each input value of the activity data set 221 to one of a given set of classes, such as defined according to one or more classification models 223.

By way of example, classification models 223 are utilized by the pattern recognition module 211 for enabling proper classification of a proximity group relative to a determined pattern. A classification model 223 may specify one or more parameters associated with a particular proximity group, including common SSIDs, IP data and other inputs that may be representative of group proximity patterns. As such, the pattern recognition module 211 exercises various processing rules for application of the activity data against the classification models 223. Under this scenario, the pattern recognition module 211 may assign a particular classification to the proximity pattern. It is noted that a classification may be a representative group name, proximity based context or profile descriptive of the proximity pattern. For example, a group of user devices belonging to study partners at a university in connection with a detected SSID of a library computer may be classified as "Study Group."

In one embodiment, the pattern recognition module 211 is configured to assign classifications to a group on a proximity relationship basis according to a predetermined threshold (e.g., percentage) of certainty. For example, when at least 80% (e.g., 4 out of 5) of the received input activity data 221 for different devices 101a-101n (e.g., SSIDs) within a given proximity correspond to a particular classification, the pattern recognition module 211 may assign that model. Alternatively, when less than 80% correlation or recognition is determined, a new classification may be assigned to the determined proximity pattern. Under this scenario, a default classification such as "New Group 1" or "Default Group" may be assigned. In one embodiment, the user device may be caused to generate a message for prompting the user to select a classification, such as through execution of the communication module 213.

The pattern recognition module 211 can further enhance a newly assigned classification, and thus establish a more complete classification model over time. This refinement occurs as the number of proximal occurrences between the devices associated with pattern are detected. For example, as additional sensory input relative to a given proximity (context) is determined, the pattern recognition module is more capable of correlating activity information with specific proximity patterns. Factors contributing to the intelligence of the pattern recognition module 211 and hence model development 223 process may include data sharing tendencies between devices, timing information, movement/vibration information, etc. By way of example, when the data sharing involves the exchanging of recipes or menus, the data correlation module 205 may correlate such data with signal data (e.g., SSID) for wireless network for the restaurant in question, thus adapting the new/default classification of "New Group 2" to "Foodie Group." As another example, activity information indicating rapid vibration of multiple devices in proximity, timing information indicating early morning activity, and a SSID for a gymnasium, may be updated from a less descriptive classification of "Gym Group" to "Running Buddy Group."

Resultantly, the pattern recognition module 211 is able to assign a level of certainty to a given proximity pattern based on the extent and scope of the available activity data set. As the number of instances of sensory input data increases relative to a specified proximity pattern, the certainty level may increase. The certainty level may also be maintained as part of the profile for a given user, as registration data 103a, so as to enable subsequent matching of the compiled proximity pattern to real time/current determined proximity patterns.

In one embodiment, a profile updating module 207 updates a profile maintained for a specific user device based on the proximity patterns as classified. For example, as a proximity pattern determination is initially classified or refined, the update is correlated to the user profile. In addition, the profile updating module ensures proper association of a classification model with a current instance of a proximity pattern as detected by the pattern recognition module 211. It is noted that as additional sensory input (presence information) relative to a given proximity pattern is developed, the pattern recognition module 211 is more capable of correlating activity information with specific proximity patterns. Resultantly, the pattern recognition module 211 is able to assign a level of certainty to a given proximity pattern based on the increased data set. The certainty level may also be maintained as part of the profile, so as to enable subsequent matching of the proximity pattern to real time/current determined proximity patterns.

In one embodiment, a shared data source activation module 205 triggers the execution of a resource to be shared among user devices based on exhibited proximity patterns. The resource may be a data source, application or combination thereof to be shared among group members given the current classification of the proximity pattern. By way of example, in the case of the "Running Buddy Group" classification described above for characterizing a group of devices within proximity of a gymnasium, the shared data source activation module 205 may trigger automated sharing of music data among the runners. In the example of the above described "Study Group," the shared data source activation module 205 may initiate distribution of course related data with the one or more devices based on the corresponding predetermined pattern. It is noted, therefore, that the shared data source activation module 205 may be configured by a user, automatically by the platform management platform 103 based (e.g., as based on metrics, statistics or historical activity data), or a combination thereof, for causing a predetermined action to be taken by the one or more devices based on a given proximity pattern classification.

In one embodiment, a controller module 209 is configured to regulate the communication processes between the various other modules. For example, the controller module 209 generates the appropriate signals to control the communication module 213 for facilitating transmission of data over the service provider network 109. Also, the controller module 209 may regulate the accessing of the various data repositories 103a, 221 and 223 by a given module.

Additionally, in one embodiment, a communication module 213 enables formation of a session over a network 109 between the proximity management platform 103 and the various devices and user devices 101a-101n. Various protocols and data sharing techniques for enabling collaborative execution between a computing device (e.g., mobile devices, laptops, smartphones, tablet computers, desktop computers) and the platform 103 over the communication network is provided by the module 213. In addition, the communication module 213 may be caused by the profile updating module 207 to generate a control signal for causing presentment of a classification or profile setting shared by the various devices subject to the proximity based group. By way of example, the classification or profile setting may be presented as a pop-up message at the interface of associated devices, along with a certainty level for indicating the degree/level to which the platform 103 deems the classification as being accurate.

Figure 3A:
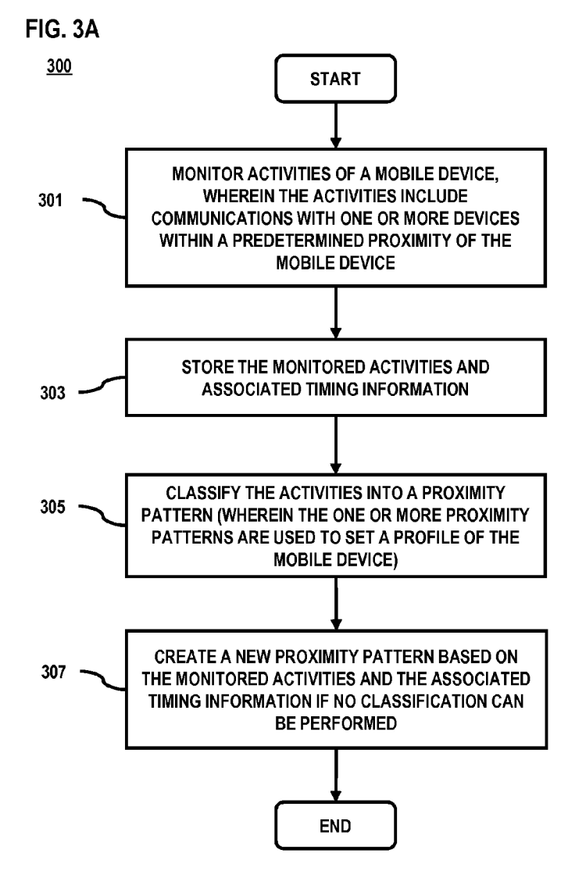
FIGS. 3A and 3B are flowcharts of a process for creating a relationship group based on physical proximity, according to various embodiments.

FIGS. 3A and 3B are flowcharts of a process for creating a relationship group based on physical proximity, according to various embodiments. For the purpose of illustration, the processes are described with respect to FIG. 1A. It is noted that the steps of the process may be performed in any suitable order, as well as combined or separated in any suitable manner. In step 301 of process 300, the proximity management platform 103 monitors activities of a mobile device (e.g., device 101a). As mentioned, the activities may include communications with one or more devices within a predetermined proximity of the mobile device 101a. In another step 303, the proximity management platform 103 stores the monitored activities and associated timing information.

Per step 305, the proximity management platform 103 classifies the activities as one or a plurality of proximity patterns. Classification may be based on one or more classification models as maintained for processing of the activity and timing information. As mentioned, the one or more proximity patterns are used to set a profile of the mobile device. In another step 307, the proximity management platform 103 may create a new proximity pattern based on the continued monitoring of activities and the associated timing information, such as in cases where no classification can be performed (e.g., absence of a relevant classification model).

In step 309 of process 308 (of FIG. 3B), the mobile device 101a stores the activities for transmission to a database that is local to the mobile device 101a, i.e., local data stores 107a. The mobile device 101a also initiates transmission of the stored activities for transmission of the sorted activities to a remote database maintained by a service provider. As mentioned, the service provider maintains the proximity management platform 103 for enabling a registered user device to take advantage of proximity based relationship services. In another step 313, the proximity management platform 103 determines that the monitored activities correspond to one of the predetermined patterns, i.e., as associated with a classification model.

Figure 3B:
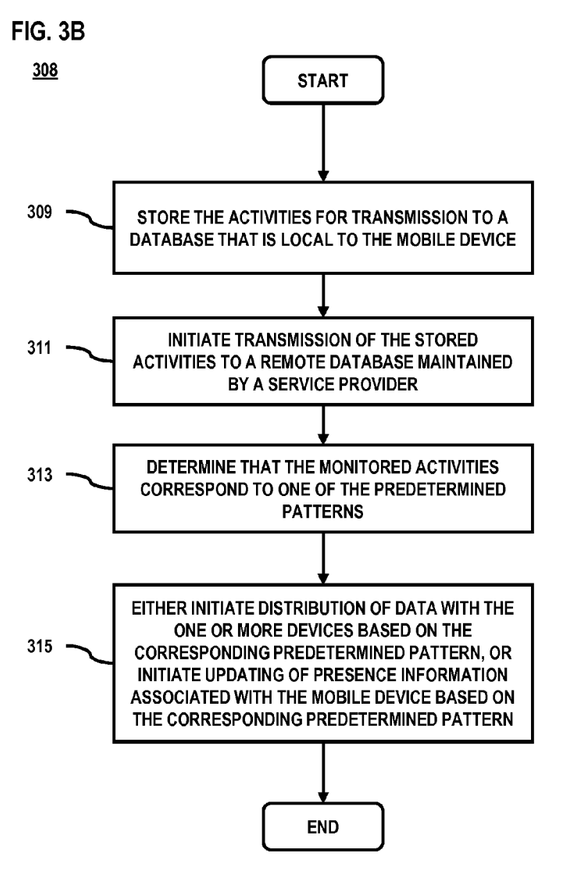

Per step 315, the proximity management platform 103 may enable execution of various actions for affecting interaction of the mobile device, one or more devices, or combination thereof, based on a determined proximity pattern. By way of example, the proximity management platform 103 either initiates distribution of data with the one or more devices based on the corresponding predetermined pattern, or initiates updating of presence information associated with the mobile device based on the corresponding predetermined pattern.

As mentioned, although the above process is explained as being performed by the platform 103, it is contemplated that the mobile device 101a, itself, can perform the process.

Figure 4:
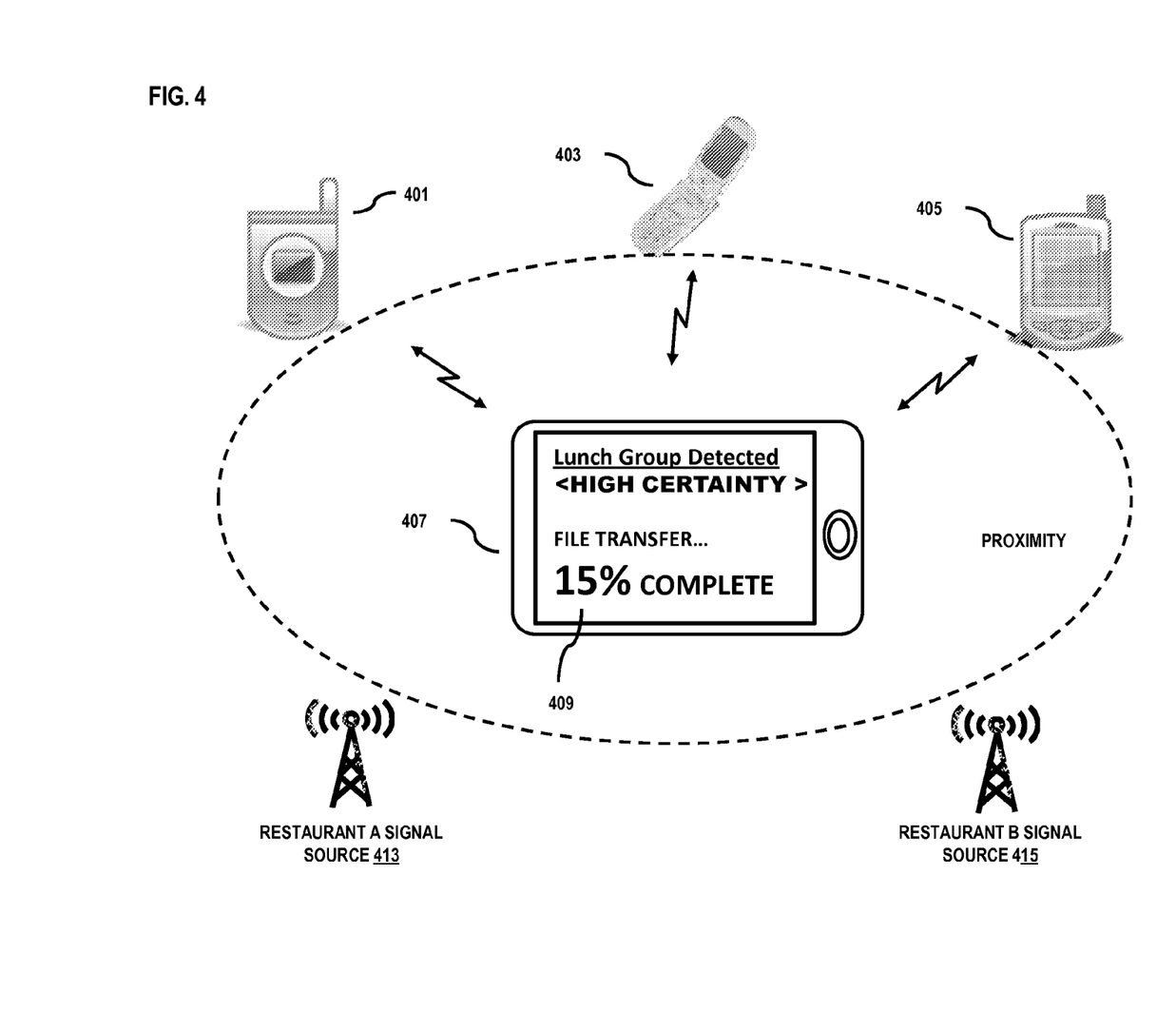
FIG. 4 is a diagram depicting an example use case involving identification of a created relationship group to enable data sharing, according to one embodiment.

FIG. 4 is a diagram depicting an example use case involving identification of a created relationship group to enable data sharing, according to one embodiment. For the purpose of illustration, the data sharing process results in a distribution of predetermined data among the devices. The process may be mutually agreed upon by one or more of the users of the user devices, or alternatively, initiated by the proximity management platform 103.

By way of example, a user of a smartphone 407 has lunch every day with a group consisting of four friends. Typically, a total of two to four of the friends always show, and they may alternate between different restaurants. Restaurants A and B are configured with a wireless network for broadcasting a unique signal (SSID) 413 and 415 respectively for detection by wireless ready devices. The friends also have user devices 401, 403 and 405 respectively, all of which are operable over a communication network. As such, the devices may determine each other's presence, such as by way of Bluetooth broadcasted signature data. In addition, the devices may detect the presence of signal source data 413 and 415. Under this scenario, the proximity management platform 103 may aggregate activity and timing information as collected by an awareness application operable on each of the devices 401-407. Using proximity based pattern recognition techniques in connection with one or more classification models, the platform 103 deduces the following pattern, as determined by the rules of Table 2:

TABLE 2

| Rule | Description |
| --- | --- |
| 1 | Any 2 of the 4 user devices in proximity (e.g., proximity threshold setting) |
| 2 | Near a particular time (e.g., noon) |
| 3 | Near a previously sensed/observed SSID (e.g., signal/SSID 413 and 415) |

Based on this proximity pattern, the platform may further determine the pattern constitutes a particular set (relationship group), therefore classifying the pattern as "Lunch Group." It is noted that formation or detection of the relationship group and its corresponding proximity classification may be presented to the user interface 409 of the respective devices. In this example, SSIDs 413 and 415 of Restaurants A and B respectively are not required participants in identifying the relationship group, but rather, provide supporting detail. For example, as the users select different places to eat from day-to-day, this data provides a context (e.g., time, location, venue, etc.) for use in recognizing the group activities and proximity patterns.

As a result of identifying and establishing the group relationship as the devices are in the presence of one another, a local communal backup software is initiated for enabling data distribution among the devices. For this scenario, user device 407 initiates a data upload procedure with each of the other user devices 401-405 of the group and accepts information from them as well. If any data is lost by any device 401-407, the next gathering of the friends and hence user devices will trigger a restoring of the lost information. Of note, the information distributed may be based on the proximity pattern and underlying activity and timing information of the user devices, as well as a determined context. For example, a certain set of data is distributed when the group visits Restaurant A (e.g., menus and reviews for that restaurant), while a different set of data is distributed when the group visits Restaurant B (e.g., notes pertaining to a major business account related to the users).

Figure 5:
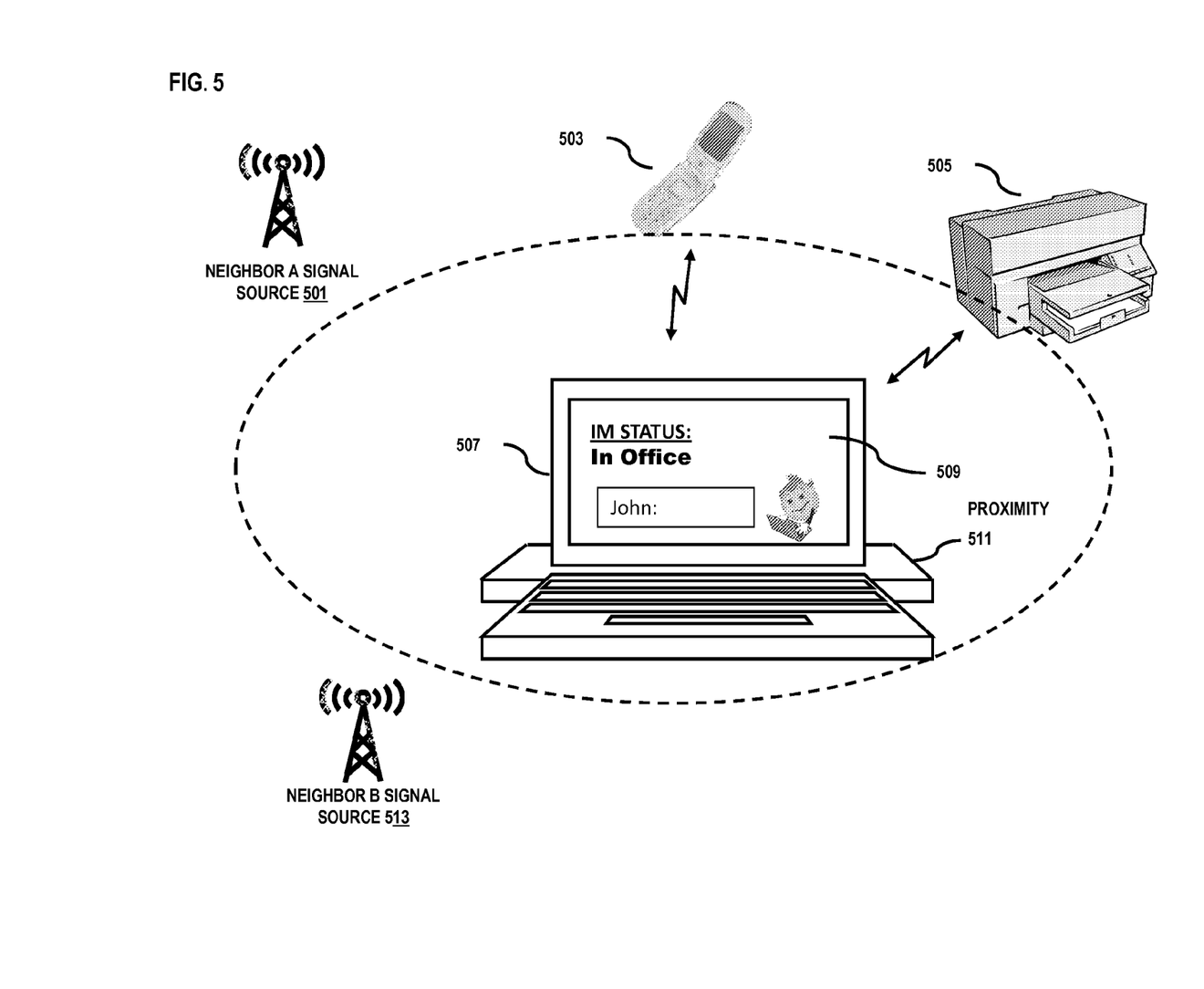
FIG. 5 is a diagram depicting a example use case involving identification of a created relationship group to enable presence detection, according to one embodiment.

FIG. 5 is a diagram depicting a example use case involving identification of a created relationship group to enable presence detection, according to one embodiment. For the purpose of illustration, the presence detection process enables the setting of a profile, such as for indicating a current proximity based relationship group classification, work status, working condition or the like. Application or device settings for adaptation based on the presence information may be mutually agreed upon by one or more of the users of the user devices, or alternatively, initiated by the proximity management platform 103.

By way of example, a device 507 recognizes it is connected to a docking station 511, which is further configured to a local area network (LAN) at the home of the user. Also sensed is a wireless printer device 505 configured to the LAN by way of a specific IP address. The SSIDs and signal intensity values (e.g., as measured in decibels) 501 and 513 are broadcast by the wireless networks of the homes of a Neighbor A and B respectively. A Bluetooth signal of a mobile device 503 belonging to the spouse of the user of device 507 is also detected. The awareness application 119 of the user device(s) employ various sensory mechanisms for gathering activity and timing information, the IP address data, tilt data as detected by an orientation/gyroscope sensor, SSID signatures, etc. Using proximity based pattern recognition techniques for processing the information, the platform 103 deduces the following pattern of Table 3:

TABLE 3

| | Pattern |
|---|---|
| 1. | Near previously sensed/observed SSID (e.g., signal/SSID 501 and 513); |
| 2. | High signal intensity levels detected within a predetermined range; |
| 3. | Recognized signal intensity levels with the predetermined range; |
| 4. | Any 3 of 4 user devices in proximity (e.g., proximity threshold setting); |
| 5. | Tilt data corresponding to known positioning of computing device when placed within the docking station; |
| 6. | Near previously sensed/observed IP addresses (e.g., IP address of printer 505 and LAN 511); |
| 7. | Common IP address elements observed between printer 505 and LAN 511 (e.g., both feature 192.168.99. xxx); and |
| 8. | Recognized Bluetooth signal (e.g., but lower certainty threshold for the broadcasting device 503 when considered individually). |

Based on this proximity pattern, the platform 103 may determine a particular set (relationship group), therefore classifying the pattern as "Home Office Group." The awareness application is thus caused to set the computing device's 507 internet messaging/chat application 509 profile to "In Office." As noted, the behavior of at least one of the user devices of the group is automatically adapted responsive to the detected proximity pattern.

When the user of device 507 leaves the office and commutes on a train, the computing device 507 senses prolonged vibration signals, a new SSID and consistently changing Bluetooth devices. This sensory input may be analyzed and defined as a classified as a travelling profile, thus causing the internet messaging application (IM) 509 to be adapted from "In Office" set to "En Route." A global positioning system (GPS) tracking tool of the device may also be activated responsive to this setting. GPS information may be correlated with other devices along the route. It is noted that the GPS tracking tools may provide further presence data input for processing by the proximity management platform 103 for refining a profile setting and increasing the certainty level.

In one embodiment, data mined by the proximity management platform 103 is able to recognize a device that normally has been seen by another user device belonging to the same relationship group, but with a different user device (e.g., a member of the group took an earlier train). This proximity based data allows the new member to confirm a proximity relationship, but perhaps with lower certainty. By associating the available incoming, real-time raw input (like a train station SSID and one other shifted user) with data as aggregated by the proximity management platform 103, the certainty level of the relationship may be increased.

The exemplary techniques and systems presented herein enable effective, convenient detection and establishment of relationship groups based on proximity patterns exhibited among user devices. The proximity pattern data may be deduced from the analysis of activity and interaction data among a group of devices within range of one another, so as trigger automated data distribution. In addition, the proximity pattern data may trigger automated updating and setting of a profile.

The processes described herein for providing proximity relationship group creation may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
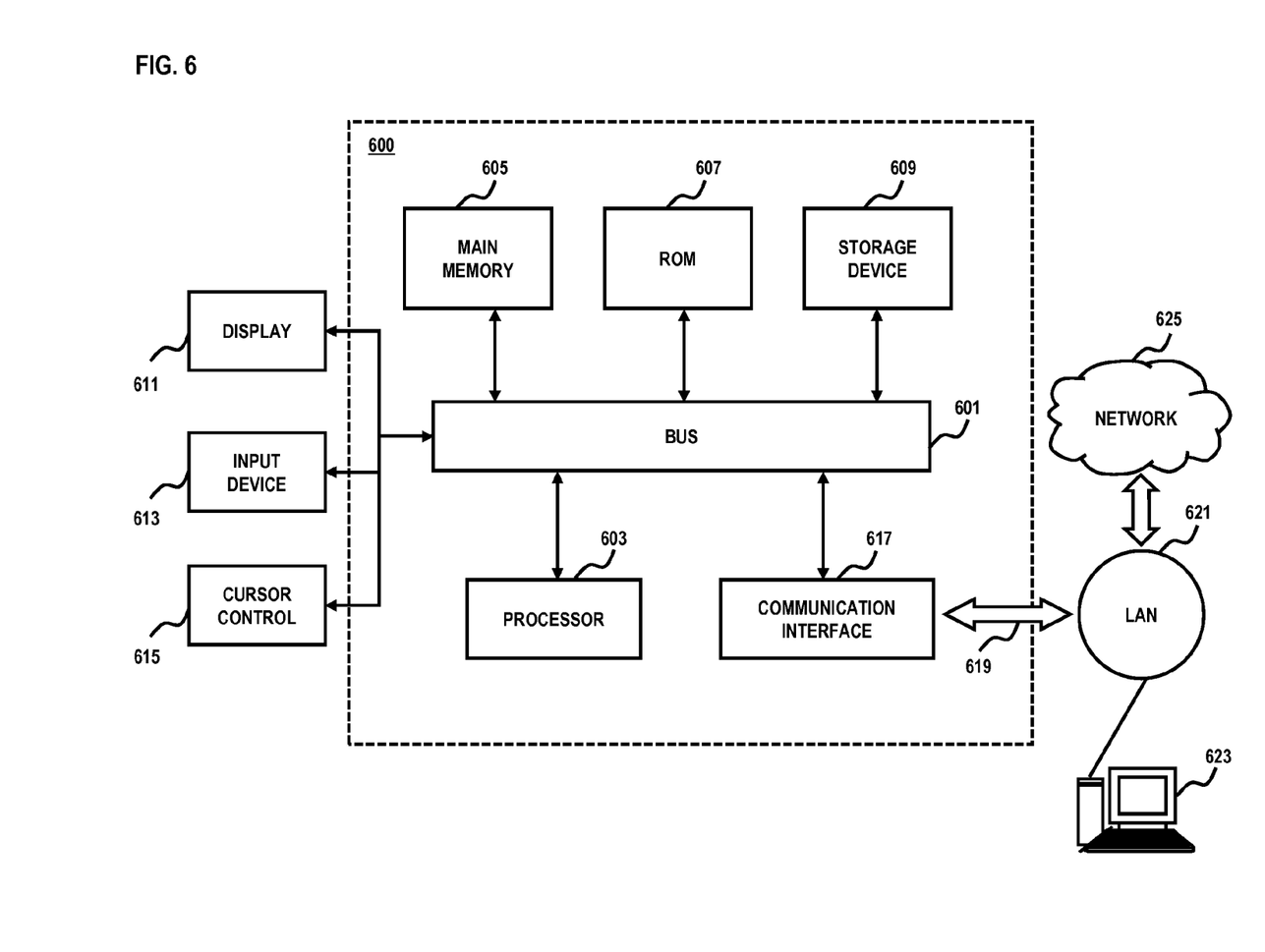
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc.

Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
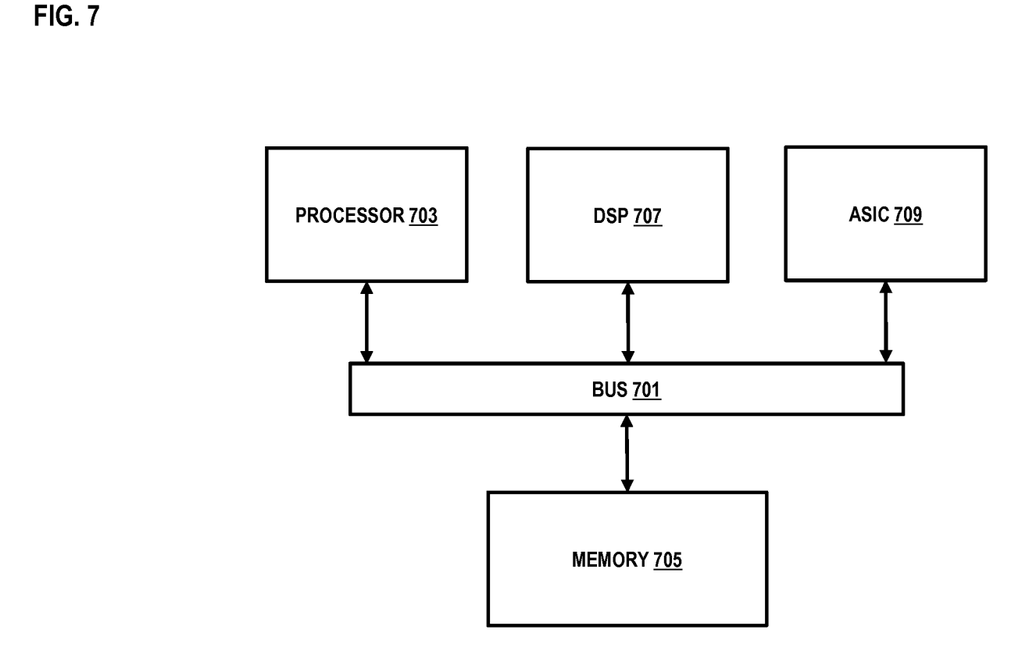
FIG. 7 is a diagram of a chip set that can be used to implement an embodiment of the invention.

FIG. 7 illustrates a chip set or chip 700 upon which an embodiment of the invention may be implemented. Chip set 700 is programmed to enable computing devices to establish and recognize a relationship group based on physical proximity as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling computing devices to establish and recognize a relationship group based on physical proximity.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable computing devices to establish and recognize a relationship group based on physical proximity. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
monitoring a plurality of activities of a mobile device, wherein the activities include communications with one or more devices within a predetermined proximity of the mobile device, and wherein the monitoring includes monitoring signals detected by one or more sensory systems of the mobile device;
storing the monitored activities and associated timing information; and
classifying the activities as one of a plurality of proximity patterns.

2. A method according to claim 1, further comprising:
creating a new proximity pattern based on the monitored activities and the associated timing information if no classification can be performed.

3. A method according to claim 1, wherein the activities include generation of sensor information from the mobile device, actions associated with one or more processes of the mobile device, utilization of network addresses, or a combination thereof.

4. A method according to claim 1, wherein the activities include establishment of communications over a wireless network that includes a local area network, a wide area network, or a cellular network.

5. A method according to claim 1, further comprising:
storing the activities for transmission to a database that is local to the mobile device; and
initiating transmission of the stored activities to a remote database maintained by a service provider.

6. A method according to claim 1, wherein the one or more proximity patterns are used to set a profile of the mobile device, and the profile is presented to a user interface of the mobile device for indicating the classification.

7. A method according to claim 1, further comprising:
determining that the monitored activities correspond to one of the predetermined patterns; and
either initiating distribution of data with the one or more devices based on the corresponding predetermined pattern, or initiating update of presence information associated with the mobile device based on the corresponding predetermined pattern.

8. A method according to claim 1, wherein the mobile device includes a mobile phone or a mobile computer.

9. An apparatus comprising:
at least one processor; and
at least one memory including computer program code for one or more programs,
the at least one memory and the computer program code configured to, with the at least one processor, cause the apparatus to perform at least the following,
monitor a plurality of activities of a mobile device, wherein the activities include communications with one or more devices within a predetermined proximity of the mobile device, and wherein the monitoring includes monitoring signals detected by one or more sensory systems of the mobile device;
store the monitored activities and associated timing information, and
classify the activities as one of a plurality of proximity patterns.

10. An apparatus according to claim 9, wherein the apparatus is further caused to:
create a new proximity pattern based on the monitored activities and the associated timing information if no classification can be performed.

11. An apparatus according to claim 9, wherein the activities include generation of sensor information from the mobile device, actions associated with one or more processes of the mobile device, utilization of network addresses, or a combination thereof.

12. An apparatus according to claim 9, wherein the activities include establishment of communications over a wireless network that includes a local area network, a wide area network, or a cellular network.

13. An apparatus according to claim 9, wherein the apparatus is further caused to:
store the activities for transmission to a database that is local to the mobile device; and
initiate transmission of the stored activities to a remote database maintained by a service provider.

14. An apparatus according to claim 13, wherein the one or more proximity patterns are used to set a profile of the mobile device, and the profile is presented to a user interface of the mobile device for indicating the classification.

15. An apparatus according to claim 9, wherein the apparatus is further caused to:
determine that the monitored activities correspond to one of the predetermined patterns; and
either initiate distribution of data with the one or more devices based on the corresponding predetermined pattern, or initiate update of presence information associated with the mobile device based on the corresponding predetermined pattern.

16. An apparatus according to claim 9, wherein the mobile device includes a mobile phone or a mobile computer.

17. A system comprising:
a processor configured to collect activity information from a mobile device, wherein the activity information is derived from monitoring of a plurality of activities of the mobile device, the activities including communications with one or more devices within a predetermined proximity of the mobile device, and the monitoring includes monitoring signals detected by one or more sensory systems of the mobile device; and
a database coupled to the processor and is configured to store the activity information,
wherein a proximity pattern is determined based on the activity information, and a profile of the mobile device is set according to the determined proximity pattern.

18. A system according to claim 17, wherein the processor is further configured to create a new proximity pattern based on the activity information.

19. A system according to claim 17, wherein the activities include generation of sensor information from the mobile device, actions associated with one or more processes of the mobile device, utilization of network addresses, or a combination thereof.

20. A system according to claim 17, wherein the activities include establishment of communications over a wireless network that includes a local area network, a wide area network, or a cellular network.

* * * * *